United States Patent
Fujiura et al.

(10) Patent No.: US 6,795,232 B2
(45) Date of Patent: Sep. 21, 2004

(54) WAVELENGTH CONVERTER

(75) Inventors: Kazuo Fujiura, Ibaraki (JP); Shogo Yagi, Ibaraki (JP); Tadayuki Imai, Ibaraki (JP); Koji Enbutsu, Ibaraki (JP); Masahiro Sasaura, Ibaraki (JP); Takashi Kurihara, Ibaraki (JP); Makoto Abe, Ibaraki (JP); Seiji Toyoda, Ibaraki (JP); Eishi Kubota, Ibaraki (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 309 days.

(21) Appl. No.: 10/108,996

(22) Filed: Mar. 29, 2002

(65) Prior Publication Data
US 2002/0141040 A1 Oct. 3, 2002

(30) Foreign Application Priority Data

Apr. 2, 2001 (JP) .................................... 2001-103552
Apr. 3, 2001 (JP) .................................... 2001-104943

(51) Int. Cl.$^7$ .............................................. G02F 1/35
(52) U.S. Cl. .................... 359/326; 359/330; 359/332; 385/122; 385/2; 385/8
(58) Field of Search ................. 385/122; 359/326–332; 372/21, 22

(56) References Cited

U.S. PATENT DOCUMENTS

| | | | | |
|---|---|---|---|---|
| 3,293,557 A | * | 12/1966 | Denton | 359/331 |
| 3,328,723 A | * | 6/1967 | Giordmaine et al. | 359/330 |
| 3,430,061 A | * | 2/1969 | Smith | 359/328 |
| 3,746,879 A | * | 7/1973 | Esaki et al. | 359/328 |
| 4,236,785 A | * | 12/1980 | Papuchon et al. | 359/326 |
| 5,013,115 A | * | 5/1991 | Kashyap | 359/328 |
| 5,317,666 A | * | 5/1994 | Agostinelli et al. | 359/328 |
| 5,434,700 A | * | 7/1995 | Yoo | 359/332 |
| 5,436,757 A | * | 7/1995 | Okazaki et al. | 359/332 |
| 5,526,173 A | * | 6/1996 | Yamaguchi et al. | 359/328 |
| 5,610,760 A | * | 3/1997 | Drenten et al. | 359/332 |
| 5,644,422 A | * | 7/1997 | Bortz et al. | 359/326 |
| 6,002,515 A | * | 12/1999 | Mizuuchi et al. | 359/326 |
| 6,175,578 B1 | * | 1/2001 | Ito | 372/22 |
| 6,353,495 B1 | * | 3/2002 | Mizuuchi et al. | 359/326 |
| 6,542,285 B1 | * | 4/2003 | Batchko et al. | 359/326 |

FOREIGN PATENT DOCUMENTS

| | | | | | |
|---|---|---|---|---|---|
| JP | 06110095 A | * | 4/1994 | | G02F/1/35 |
| JP | 08160476 A | * | 6/1996 | | G02F/1/35 |

* cited by examiner

*Primary Examiner*—John D. Lee
*Assistant Examiner*—Scott Alan Knauss
(74) *Attorney, Agent, or Firm*—Venable LLP; Michael A. Sartori; Daniel G. Vivarelli

(57) ABSTRACT

A wavelength converter implements high speed, high efficiency, low noise wavelength conversion without performing high voltage poling of a crystal, and enables switching and modulation of converted light in response to an electric field. A KLTN crystal, includes a deposited-gold electrode within its incidence plane, and is connected to a DC power supply via a copper wire. The crystal material is composed of $KTa_{1-x}Nb_xO_3$ and/or $K_{1-y}Li_yTa_{1-x}Nb_xO_3$. A polarizer controls the polarization of the fundamental wave in the direction parallel to the electric field, and launches it into the electrode of the KLTN crystal. The KLTN crystal, rotating on an axis in the direction of the electric field, launches only part of the generated SHG light with the same polarization direction as that of the incident light into a photo multiplier tube through a polarizer.

37 Claims, 10 Drawing Sheets

SIGNAL WAVELENGTH OBTAINED AT INDIVIDUAL STAGES

| SIGNAL LIGHT | 1528 | 1529 | 1530 | 1531 | 1532 | 1533 | 1534 | 1535 | 1536 | 1537 |
|---|---|---|---|---|---|---|---|---|---|---|
| FIRST STAGE | 1547 | 1546 | 1545 | 1544 | 1543 | 1542 | 1541 | 1540 | 1539 | 1538 |
| SECOND STAGE | 1571 | 1570 | 1569 | 1568 | 1567 | 1566 | 1565 | 1564 | 1563 | 1562 |
|  | 1552 | 1553 | 1554 | 1555 | 1556 | 1557 | 1558 | 1559 | 1560 | 1561 |
| THIRD STAGE | 1611 | 1610 | 1609 | 1608 | 1607 | 1606 | 1605 | 1604 | 1603 | 1602 |
|  | 1592 | 1593 | 1594 | 1595 | 1596 | 1597 | 1598 | 1599 | 1600 | 1601 |
|  | 1568 | 1569 | 1570 | 1571 | 1572 | 1573 | 1574 | 1575 | 1576 | 1577 |
|  | 1587 | 1586 | 1585 | 1584 | 1583 | 1582 | 1581 | 1580 | 1579 | 1578 |
| FOURTH STAGE | 1591 | 1590 | 1589 | 1588 | 1587 | 1586 | 1585 | 1584 | 1583 | 1582 |
|  | 1672 | 1673 | 1674 | 1675 | 1676 | 1677 | 1678 | 1679 | 1680 | 1681 |
|  | 1648 | 1649 | 1650 | 1651 | 1652 | 1653 | 1654 | 1655 | 1656 | 1557 |
|  | 1667 | 1666 | 1665 | 1664 | 1663 | 1662 | 1661 | 1660 | 1659 | 1658 |
|  | 1608 | 1609 | 1610 | 1611 | 1612 | 1613 | 1614 | 1615 | 1616 | 1617 |
|  | 1627 | 1626 | 1625 | 1624 | 1623 | 1622 | 1621 | 1620 | 1619 | 1618 |
|  | 1651 | 1650 | 1649 | 1648 | 1647 | 1646 | 1645 | 1644 | 1643 | 1642 |
|  | 1632 | 1633 | 1634 | 1635 | 1636 | 1637 | 1638 | 1639 | 1640 | 1641 |

FIG.10

WAVELENGTH CONVERTER

This application is based on Japanese Patent Application Nos. 2001-103552 filed Apr. 2, 2001 and 2001-104943 filed Apr. 3, 2001, the contents of which are incorporated hereinto by reference.

BACKGROUND OF THE INVENTION

1. Field of the Invention

The present invention relates to a wavelength converter used for optical communication, optical measurement or display devices, and more particularly to a wavelength converter applicable to optical signal processing that requires high speed, high efficiency and low noise wavelength conversion. In addition, the present invention relates to a wavelength converter as a multi-wavelength light source used for wavelength division multiplexing communication requiring low noise signal light with multiple wavelengths and accurate channel spacing.

2. Description of the Related Art

Conventionally, a wavelength tunable laser, which is implemented by irradiating a crystal or a liquid or gas medium, which possesses second order or third order nonlinearity, with a high power laser beam to convert the laser beam to a wavelength region the laser cannot oscillate, is applicable as a wide range wavelength tunable light source. This technique is generally called an optical wavelength conversion using nonlinear optical media. As for materials of the wavelength conversion media utilizing the secondary nonlinear optical effect, inorganic crystals are applied to many wavelength conversion media at present.

To implement such wavelength conversion, an optical waveguide is often employed to make effective use of the nonlinear optical coefficient of the material. The wavelength converters proposed so far include those utilizing the cross gain modulation, cross phase modulation, and four wave mixing (optical mixing using third-order nonlinear polarization) of optical semiconductors.

In addition, the phase matching is considered as an effective method to be applied to inorganic materials such as KTP and LiNbO$_3$, and techniques are proposed which utilize temperature tuning, angle tuning, and quasi-phase matching in which less cancellation takes place between a nonlinear polarization wave based on a fundamental wave and a propagation high frequency generated.

As for the wavelength conversion utilizing optical semiconductors that are under development at present, they are inapplicable to optical communication or optical measurement that requires high speed and low noise because they have large noise due to their spontaneous emission light, and their speed limit due to carrier lifetime. In addition, although LiNbO$_3$ quasi-phase matching devices are proposed as a high-speed, low-noise wavelength converter, they have drawbacks such as insufficient conversion efficiency, requiring an interaction length of at least 5 cm to achieve preferable conversion efficiency. Furthermore, it has a problem of having polarization sensitivity that the conversion efficiency varies sharply depending on the orientation of the crystal.

Moreover, the domain inversion for the quasi-phase matching must undergo poling using a high voltage, offering a problem of low yields. Besides, since the domain inversion by the poling must be formed such that it makes phase matching with a specified wavelength, the wavelength of the pumping light must be fixed.

As a result, the wavelength converter fabricated has a problem in that it can convert only to a fixed wavelength, and hence cannot convert to a wavelength required. The converting function to a desired wavelength is needed for equipment such as optical switching systems and optical routers, which carry out routing using wavelengths as routing information. In addition, the function is important to circumvent blocking of wavelengths, which can occur when multiple wavelength signals are supplied to a single system.

At present, installation of wavelength division multiplexing (WDM) systems is accelerated to implement large capacity communications. The WDM systems can reduce the cost of a system by transmitting multiple signals with different wavelengths through a single optical fiber. Therefore, it can increase the transmission capacity without installing a new fiber.

Although the method has an advantage in the fiber installation cost, it has a problem of requiring many light sources with high wavelength accuracy to achieve high density. Up to now, a method is used which selects semiconductor lasers that precisely fit to the wavelengths of the signal light, and disposes them by the number required. This method, however, has a problem of increasing cost because of the selection of lasers suitable for the wavelengths.

Alternatively, a method using a semiconductor mode-locking laser or fiber ring laser is also proposed. In addition, a spectral slice light source is proposed which slices supercontinuum (SC) light that is generated by the short-pulse light source and nonlinear optical fiber by an arrayed waveguide grating demultiplexer. However, since it requires a long nonlinear fiber to generate the SC light, it has a problem of making it difficult to reduce its size.

SUMMARY OF THE INVENTION

The present invention is implemented considering the foregoing problems. Therefore, an object of the present invention is to provide a high efficiency, low noise wavelength converter that can be implemented without the high voltage poling of a crystal, and that can carry out switching and modulation of converted light by using electric field.

Another object of the present invention is to provide a wavelength converter functioning as a multi-wavelength light source capable of controlling a wavelength band or the number of wavelengths by selecting electrodes to which electric fields are applied.

To accomplish the objects, according to the present invention, there is provided a wavelength converter for producing converted light with a wavelength corresponding to an energy difference between signal light and pumping light with a wavelength different from that of the signal light, by launching the signal light and the pumping light into a crystal material simultaneously, wherein the crystal material consists of a crystal composed of at least one of $KTa_{1-x}Nb_xO_3$ and $K_{1-y}Li_yTa_{1-x}Nb_xO_3$.

In addition, to accomplish the objects, according to a present invention, there is provided a wavelength converter operating as a multi-wavelength light source including a planar optical waveguide comprising: a core with a high refractive index composed of a crystal material with a composition of at least one of $KTa_{1-x}Nb_xO_3$ and $K_{1-y}Li_yTa_{1-x}Nb_xO_3$; a cladding surrounding the core; an electrode that is formed on a surface of the optical waveguide and has a fixed electrode period; signal light generating means for generating signal light with at least one wavelength; and pumping light generating means for generating pumping light with a wavelength different from that of the signal light output from the signal light generating means, wherein the signal light and the pumping light are launched simultaneously into the optical waveguide to generate signal light with at least one wavelength.

Thus, the present invention is characterized in that it utilizes the crystal with the composition of $KTa_{1-x}Nb_xO_3$ and/or $K_{1-y}Li_yTa_{1-x}Nb_xO_3$ as a medium for achieving the wavelength conversion. These KTN and KLTN crystals are a cubic system with centrosymmetry in an applied temperature range. Although they have no second order nonlinear effect, they are characterized by exhibiting secondary nonlinear effect in response to an electric field applied. Therefore, it is possible to implement the multiple wavelength generation based on the differential frequency generation by applying the electric field to the electrode with the period that makes phase matching with the signal light and pumping light.

The efficiency of the nonlinear optical effect increases in proportion to the electric field applied, and offers a twice or more efficiency as compared with the conventional $LiNbO_3$ nonlinear optical crystal within a range of a practical electric field to be applied. Accordingly, it can implement the wavelength conversion with four times or more efficiency using the same interaction length as the conventional LN wavelength converter, or with the same efficiency using less than half the interaction length. In addition, when the electric field is removed, the KTN and KLTN crystals are simply a transparent medium without causing any changes in the signal light. Thus, they can achieve such a function as turning the converted light on and off by switching the electric field on and off. In addition, the converted light can be modulated by modulating the electric field applied.

In addition, as for the conventional wavelength converter, since the LN crystal is a trigonal system, the c axis must be aligned to the polarization of the incident light to obtain the maximum nonlinear effect, and the quasi-phase matching is achieved by inverting the spontaneous polarization in the c axis direction. Therefore, in the differential frequency generation by the LN wavelength converter, the polarization direction of convertible light is limited by the direction of the domain inversion produced, making it impossible to achieve high conversion efficiency in the other polarization. In contrast, the KTN and KLTN used in the present invention are an isotropic crystal with exhibiting a nonlinear characteristic in the direction of the applied electric field. Thus, they have an advantage of being able to implement the polarization insensitive wavelength converter easily with such a structure as including two electrodes perpendicular to each other to which the electric fields are applied.

Furthermore, the wavelength converter in accordance with the present invention has an advantage of being able to obviate the need for the high voltage poling of the crystal which is required by the conventional LN wavelength converter, and to implement the quasi-phase matching easily by forming the electrode. This is because forming several type of electrodes with different periods on the surface of the crystal makes it possible to select the wavelength of the pumping light in accordance with the period, thereby being able to provide the wavelength converter with those functions. Furthermore, since the principle of the wavelength conversion in accordance with the present invention is based on the differential frequency generation, which is a parametric process, it offers an advantage of high speed beyond THz and noise free characteristic. Thus, it can implement the performance that no wavelength conversion using the optical semiconductors can achieve. Besides, since the converted light is generated by the interaction between the signal light and pumping light, it is shaped up into a pulse train consisting of short-width pulses. Accordingly, when the pumping light consists of a short-width pulse train such as that of a fiber-ring laser, even if the signal light is generated by a broad light source such as a semiconductor laser generating light including jitters, the wavelength converter in accordance with the present invention can generate high quality light.

Furthermore, differential frequencies, the number of which corresponds to the number of the electrodes, can be obtained by disposing the electrodes with different periods in the direction of the waveguide, by launching the pumping light that phase matches with the periods, and by applying the electric fields to all the electrodes. When the initial incident signal light has multiple wavelengths, the number of wavelengths the device can produce is equal to $n \times 2^m$, where n is the number of wavelengths of the initial incident signal light, and m is the number of electrodes. For example, when the number of the wavelengths of the initial incident light is 10, and the number of the electrodes is four, it can generate 160 waves.

In addition, since the channel spacing of the signal light generated by this method is determined by energy difference between the channel spacing of the initial incident signal light and the wavelength corresponding to half the energy of the pumping light, the wavelength converter in accordance with the present invention can generate the light with a uniform channel spacing precisely matching the ITU-T grid.

Furthermore, it has an advantage of being able to offer high speed beyond THz and noise free characteristic in principle. In addition, it operates as a wavelength tunable light source by sequentially applying the electric field via the electrodes that have quasi-phase matching with different wavelengths. The light source can also operate as a variable wavelength light source incorporating a modulator, because it can generate a modulated signal by modulating the electric field by some other method.

Although the embodiments below utilize a rectangular buried waveguide, similar characteristics can be achieved by a diffusion waveguide fabricated using ion diffusion.

Thus, according to the present invention, the crystal material consists of a crystal composed of $KTa_{1-x}Nb_xO_3$ and/or $K_{1-y}Li_yTa_{1-x}Nb_xO_3$ in the wavelength converter that produces converted light with a wavelength corresponding to an energy difference between the signal light and pumping light with a wavelength different from that of the signal light by launching the signal light and the pumping light into the crystal material simultaneously. As a result, the present invention can implement the high efficiency, low noise wavelength conversion without performing the high voltage poling of the crystal which is essential for the conventional wavelength converter. In addition, it can achieve the switching and modulation of the converted light by the electric field.

Moreover, it can achieve the polarization insensitive wavelength conversion, which is impossible for the conventional converter. This enables the optical signal processing indispensable for the optical routing applied to the optical communication field, thereby implementing a router with simple configuration at low cost. The wavelength conversion is free from noise, and causes no signal degradation even through the wavelength conversion is repeated by a number of stages. Accordingly it is applicable to a router that repeats the signal processing many times. In addition, in the optical measurement field, it can demultiplex a ultra-fast optical signal at high efficiency, offering an advantage of being able to fabricate ultra-fast optical signal measuring instruments with a simple configuration.

As for other applications, using the wavelength converter in accordance with the present invention can implement high wavelength conversion efficiency that cannot be achieved by conventional devices, and the second harmonic generation by the converter makes it possible to use it as a blue color emitted laser light source.

Furthermore, according to the present invention, the wavelength converter includes the electrode that is formed on a surface of the optical waveguide and has a fixed electrode period; a signal light generating means for generating signal light with at least one wavelength; and a pumping light generating means for generating pumping light with a wavelength different from that of the signal light output from the signal light generating means, wherein the signal light and the pumping light are launched simultaneously into the optical waveguide to generate signal light with at least one wavelength. Thus, it can implement a multi-wavelength light source, which cannot be realized by the conventional technique, on a single chip. In addition, it can control the number of wavelengths and wavelength band by selecting the electrodes to which the electric field is applied. Furthermore, it offers an advantage of being able to generate the short-pulse signal light with ease. Thus, the present invention can implement the multi-wavelength light source applied to the wavelength division multiplexing communication with a simple and inexpensive configuration.

As described above, the KTN crystal and KLTN crystal used in the present invention assume that they are used as a cubic system. However, the ferroelectric phase transition temperature from the cubic to tetragonal system is controllable in a range of −250° C.–400° C. by varying composition of the Nb and Ta. In this case, by using a crystal with the phase transition temperature above the room temperature, and by cooling it below the phase transition temperature with applying the electric field via the electrode, the spontaneous polarization occurs in the direction of the electric field applied, and is fixed. A wavelength converter requiring no application of the electric field can be configured by controlling the phase transition temperature. The polarization structure thus configured can be eliminated by elevating its temperature beyond the phase transition temperature.

The above and other objects, effects, features and advantages of the present invention will become more apparent from the following description of embodiments thereof taken in conjunction with the accompanying drawings.

BRIEF DESCRIPTION OF THE DRAWINGS

FIGS. 9A and 9B are cross-sectional views of electrodes perpendicular to the waveguide, wherein FIG. 9A shows an electrode for TM polarization, and FIG. 9B shows an electrode for TE polarization; and FIG. 10 is a table showing wavelengths generated by applying electric fields to electrodes at a desired time.

DETAILED DESCRIPTION OF PREFERRED EMBODIMENTS

The embodiments in accordance with the present invention will now be described with reference to accompanying drawings.

[Embodiment 1]

In the present embodiment 1, the wavelength conversion performance of the KLTN crystal material is confirmed by generating a second harmonic using a KLTN crystal material.

Figure 1:
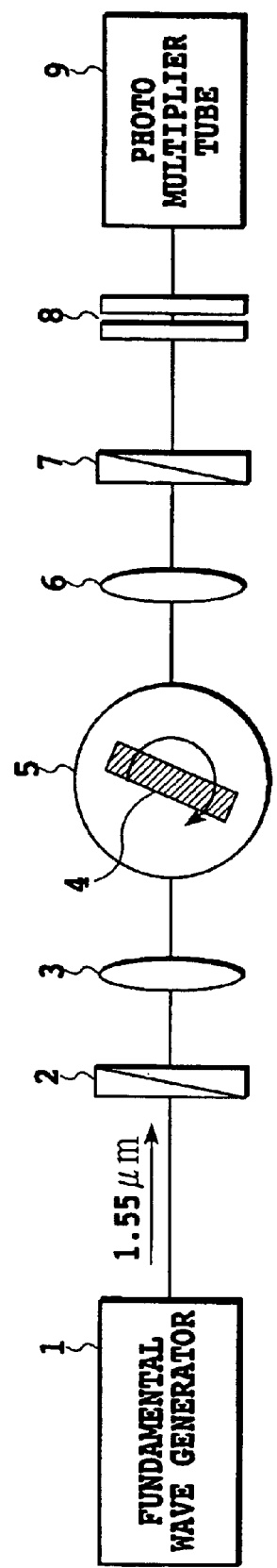
FIG. 1 is a block diagram showing a configuration of a device used for second harmonic generation in an embodiment 1 in accordance with the present invention.

FIG. 1 is a diagram showing a configuration for the second harmonic generation using a KLTN crystal. The KLTN crystal 4 is a 0.5 mm thick plate with its both surfaces optically polished. It includes electrodes formed within an incidence plane by depositing gold, and connected to a DC power supply through copper wires connected to the electrodes. The crystal material is composed of $KTa_{1-x}Nb_xO_3$ and/or $K_{1-y}Li_yTa_{1-x}Nb_xO_3$.

A fundamental wave generator 1 generates a 1.55 μm fundamental wave in accordance with to a differential frequency between an Nd:YAG Q-switched laser and an excimer laser. A polarizer 2 controls the polarization of the fundamental wave in the direction parallel to the electric field, and launches it between the electrodes of a KLTN crystal 4 mounted on a rotary stage 5 via a lens 3. The KLTN crystal 4, rotating on an axis in the direction of the electric field, causes the SHG (Second Harmonic Generation) light to pass through a polarizer 7 via a lens 6. The SHG light passes through a filter 8 so that only the light with the same polarization direction as that of the incident light is launched into a photo multiplier tube 8.

Figure 2:
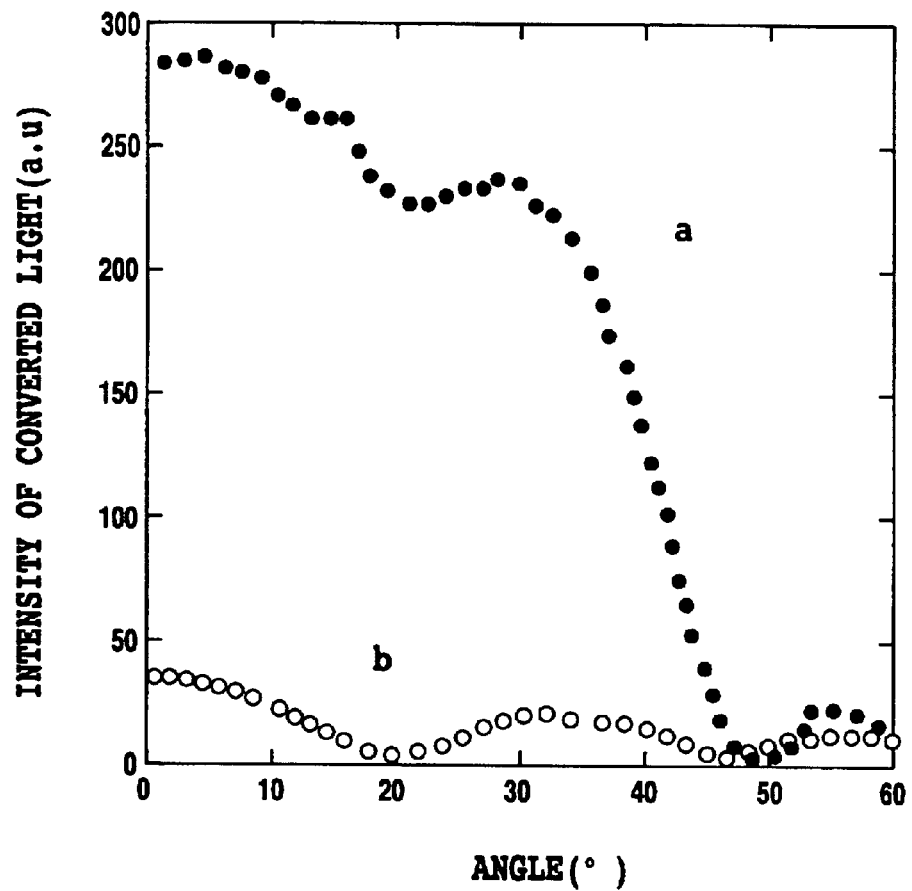
FIG. 2 is a graph illustrating a generating example of the second harmonic in the embodiment 1.

The incident angle dependence of the generated SHG light was measured by this method. The SHG light was measured in the same setup by launching the fundamental wave in the direction of the z-axis of an LN with X-cut, and it was compared with the SHG light intensity of the KLTN. FIG. 2 illustrates its result. In FIG. 2, a denotes the second harmonic from the KLTN crystal of the present embodiment 1, and b denotes the second harmonic from the LN used as a standard sample. FIG. 2 clearly shows that the KLTN crystal supplied with the electric field generates the SHG light a, and that the crystal comes to have the wavelength conversion function by the electric field applied thereto.

The angle dependence of the SHG light intensity illustrated in FIG. 2 is based on the relationship between the nonlinear coherence length of the crystal and the interaction length of the fundamental wave, the peak interval of which allows to estimate the depth of the effective electric field formed in the KLTN. In this case, it is estimated about 0.2 mm. The SHG intensity obtained by applying the electric field of one KV/cm is about 10 times greater than that of the LN, corresponding to about 79 pm/V in terms of a second order nonlinear coefficient. This is the greatest second order nonlinear coefficient among the nonlinear optical crystals reported up to now.

Furthermore, a new electrode was formed on the surface, on which the electrodes used in the foregoing measurement were not formed, such that the two electrodes become perpendicular. The two electrodes were supplied with the one KV/cm electric field, and the fundamental wave was normally launched onto the two electrodes. In this case, the SHG light with the same intensity was observed for the two polarized waves, thereby demonstrating that the KLTN crystal can achieve the wavelength conversion of the signal light including any polarized wave by controlling the application direction of the electric fields.

Figure 3:
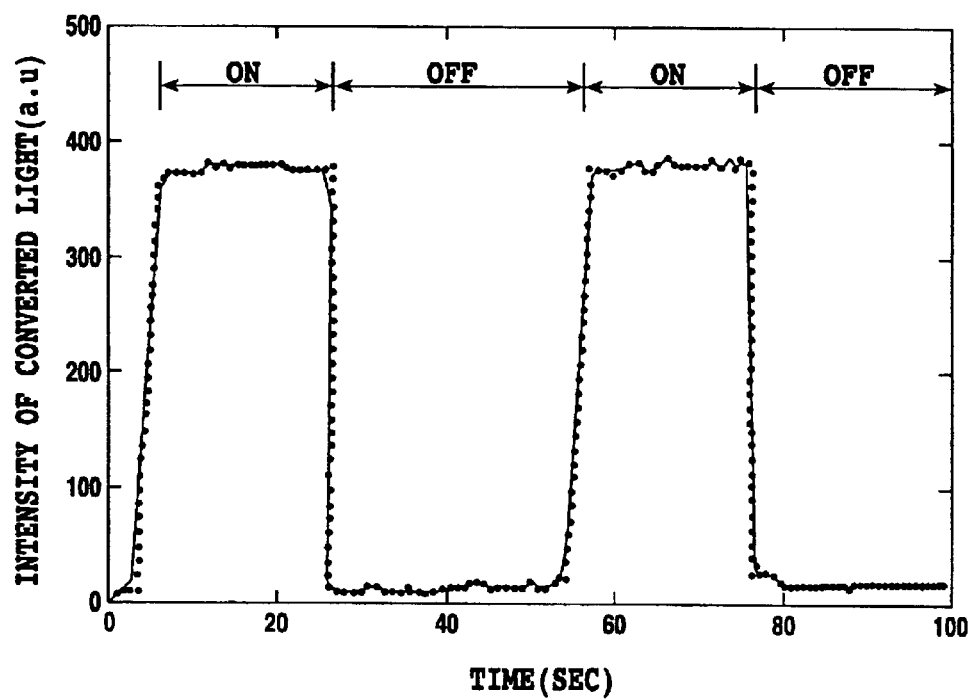
FIG. 3 is a graph illustrating a second harmonic produced by turning applied electric field on and off in the embodiment 1.

FIG. 3 illustrates the rate of change of the SHG light intensity with respect to time, which was measured by turning the electric field on and off. It is clear from FIG. 3 that the SHG light was generated by applying the electric field, and eliminated by removing it. Thus, it is obvious that the KLTN crystal functions as a transparent medium without the electric field, and as a switch capable of turning on and off the converted light by the on-off of the electric field. In addition, since the nonlinear constant varies in proportion to the applied voltage, it is clear that the KLTN crystal operates not only as the switch, but also as a modulator capable of modulating the converted light intensity by the electric field.

[Embodiment 2]

Figure 4:
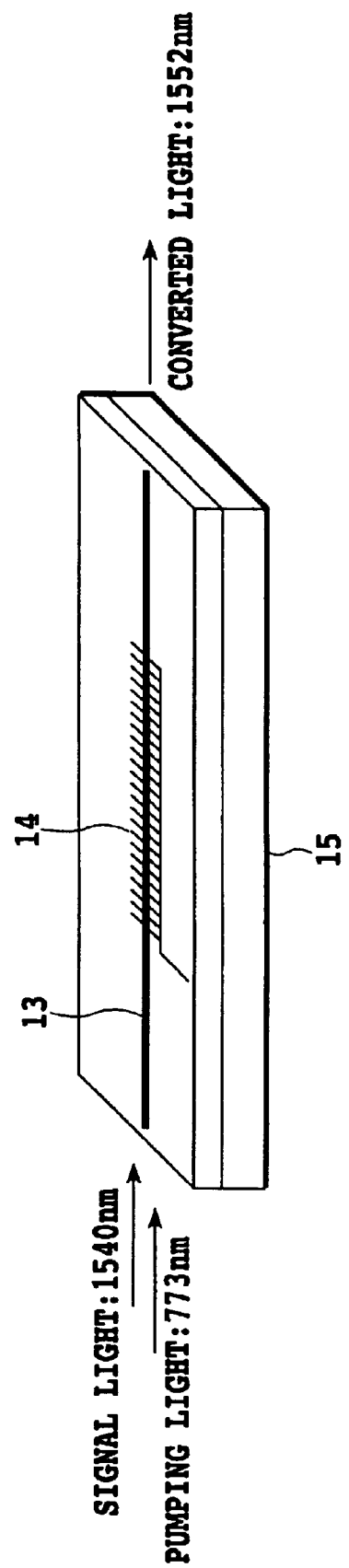
FIG. 4 is a perspective view showing a structure of a wavelength converter fabricated in an embodiment 2 in accordance with the present invention.

A rectangular waveguide structure as shown in FIG. 4 was fabricated using photolithography and liquid phase epitaxial technique. The fabricated KLTN waveguide 13 has a refractive index difference of 2.5%, and the cutoff wavelength in a high-order mode is 0.6 $\mu$m. Thus, it functions as a single-mode waveguide for a long wavelength. The fabricated waveguide was 3 cm long, and the loss of the waveguide was 0.15 dB/cm.

FIG. 4 shows a wavelength converter fabricated in this way. A substrate 15 was composed of $SrTiO_3$ doped with La, and gold was deposited on a top electrode 14. The period of the electrode elements corresponds to the grating period that enables the quasi-phase matching needed for the wavelength conversion of 1.55 $\mu$m band using the pumping light of 0.775 $\mu$m. In this case, the period of electrode elements becomes 12 $\mu$m. The outgoing light was measured using an optical spectrum analyzer with applying the voltage of one KV/cm to the electrode, and launching the 1.54 $\mu$m signal light and 0.775 $\mu$m pumping light simultaneously into the incidence edge using a polarization-maintaining optical fiber.

Figure 5:
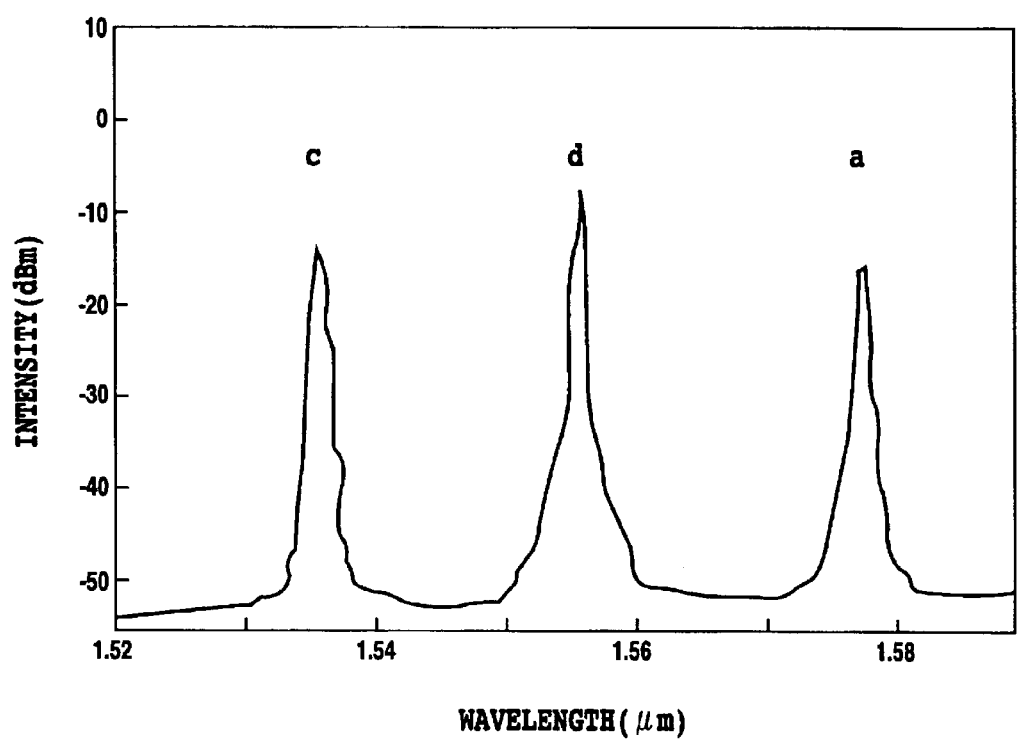
FIG. 5 is a graph illustrating a spectrum after the wavelength conversion in the embodiment 2.

FIG. 5 is a graph illustrating a spectrum after the wavelength conversion. In FIG. 5, the reference symbol c designates input signal light, d designates the second-order diffraction light of the pumping light and e designates the converted light. FIG. 5 clearly shows that the wavelength conversion is implemented by the differential frequency generation. In addition, the signal light and converted light undergo the parametric amplification, and the gain of the converted light with respect to the input signal light reaches about 15 dB, which is such a high gain that the conventional LN wavelength converter cannot achieve. Furthermore, the conversion efficiency can also be controlled by varying the intensity of the electric field applied, and it is only the signal light that is output by turning off the electric field. Moreover, it was also possible to control the electric field such that the converted light intensity was maintained at a constant value against the variable input signal light intensity with fixing the pumping light intensity and by monitoring the output signal light intensity.

Although the present embodiment 2 uses the KLTN waveguide, similar wavelength conversion was implemented by using a KTN waveguide. The KTN waveguide had a propensity to vary its efficiency more sensitively to temperature than the KLTN waveguide.

[Embodiment 3]

Figure 6:
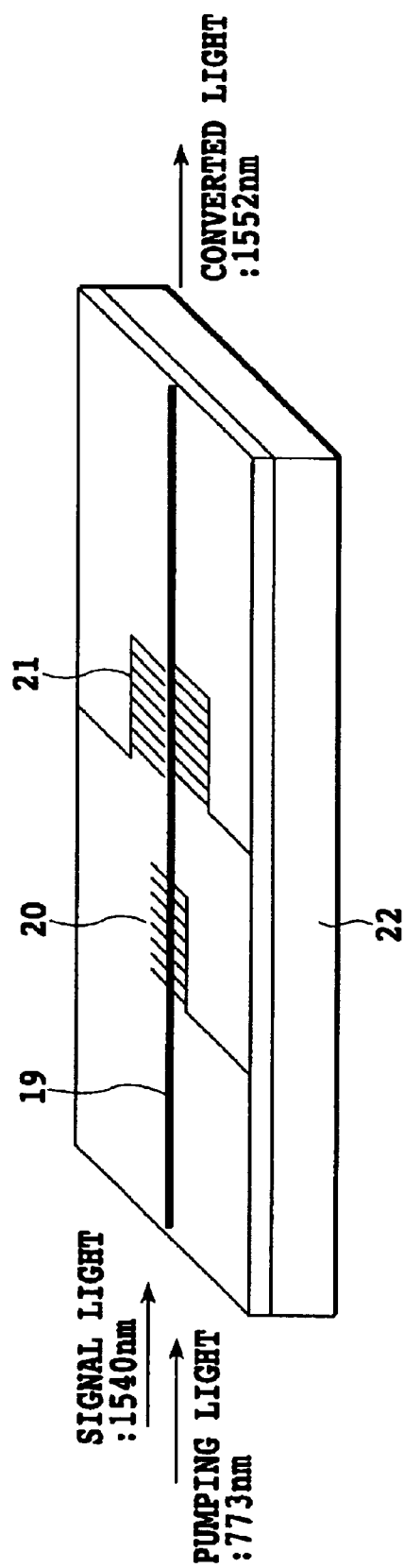
FIG. 6 is a perspective view showing a structure of a wavelength converter fabricated in an embodiment 3 in accordance with the present invention.

A device as shown in FIG. 6 was fabricated by adding new electrodes to the wavelength converter of the foregoing embodiment 2, and an experiment similar to that of the embodiment 2 was conducted concerning the wavelength conversion. In FIG. 6, the reference numeral 19 designates a KLTN waveguide, 20 designates a top electrode for TM polarization for converting a TM polarization, 21 designates an electrode for TE polarization for converting a TE polarization, 22 designates an La-doped $SrTiO_3$ used as a bottom electrode for the TM polarization and as a substrate. The wavelength conversion characteristics were measured for both the TE and TM polarizations this time.

Figure 9A:
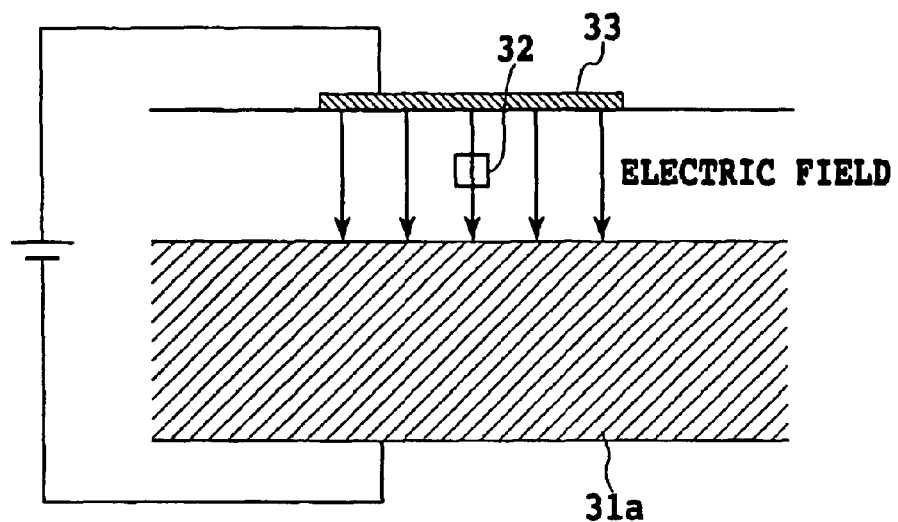
Figure 9B:
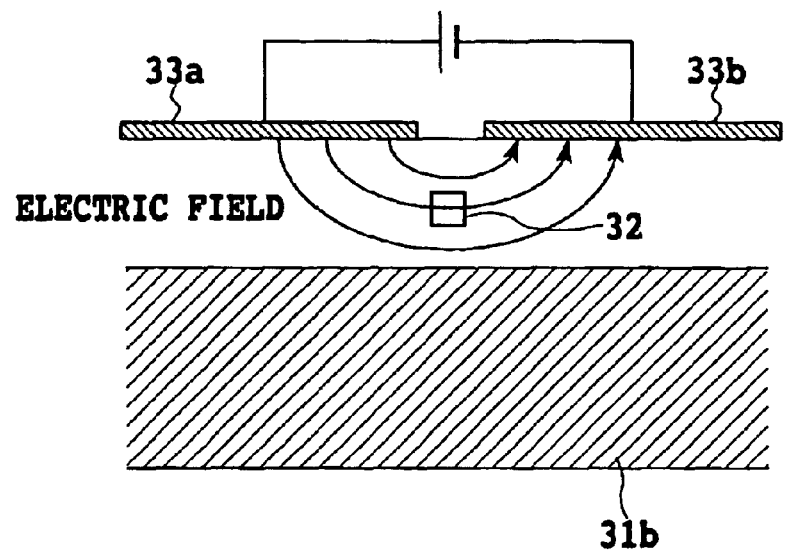

FIGS. 9A and 9B show cross-sections of the electrodes perpendicular to the waveguide: FIG. 9A shows the placement of the electrode for the TM polarization; and FIG. 9B shows the placement of the electrode for the TE polarization. In these figures, the reference numeral 31a designates an electrode (substrate), 31b designates a substrate, and 32 designates a waveguide, and reference numerals 33, 33a and 33b each designate an electrode. Since the electric field distribution differs depending on the electrode structure, the TE polarization requires about 1.5 times greater electric field than the TM polarization to obtain the same conversion efficiency between the TE and TM. However, it was easy to implement polarization insensitive wavelength conversion by adjusting the electric field applied. In addition, it was possible to implement the wavelength conversion of only one of the polarized waves by turning on and off the electric field.

[Embodiment 4]

Figure 7:
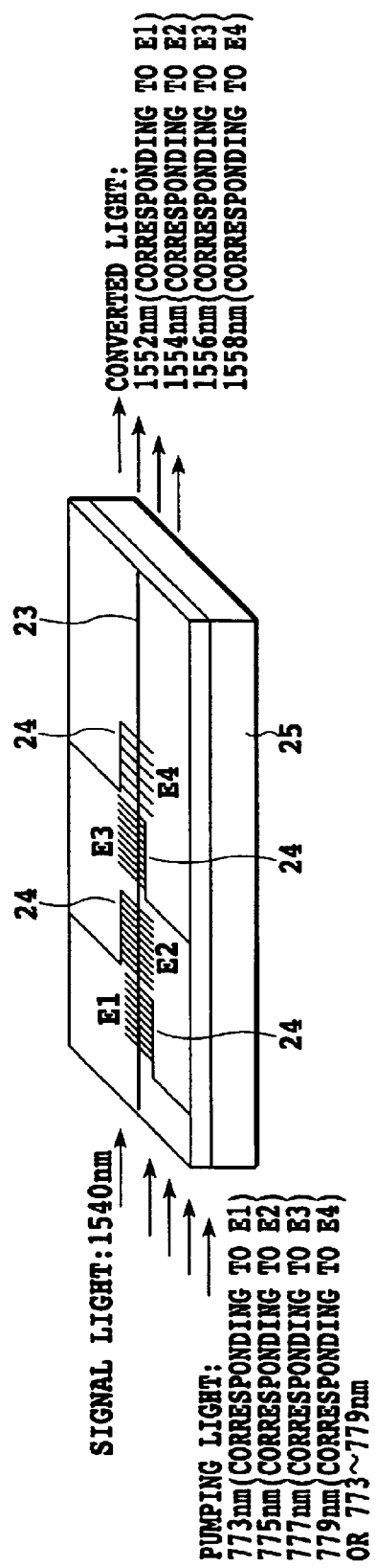
FIG. 7 is a perspective view showing a structure of a wavelength converter fabricated in embodiments 4 and 6 in accordance with the present invention.

A wavelength conversion experiment was conducted using a device that had nearly the same structure as the device of the foregoing embodiment 3, and included four types of electrodes with different element periods provided in the longitudinal direction of the waveguide. FIG. 7 shows a structure of the wavelength converter fabricated in this way. In FIG. 7, the reference numeral 23 designates a KLTN waveguide, each reference numeral 24 designates a top electrode, and 25 designates an La-doped $SrTiO_3$ used as a bottom electrode and substrate.

Figure 8:
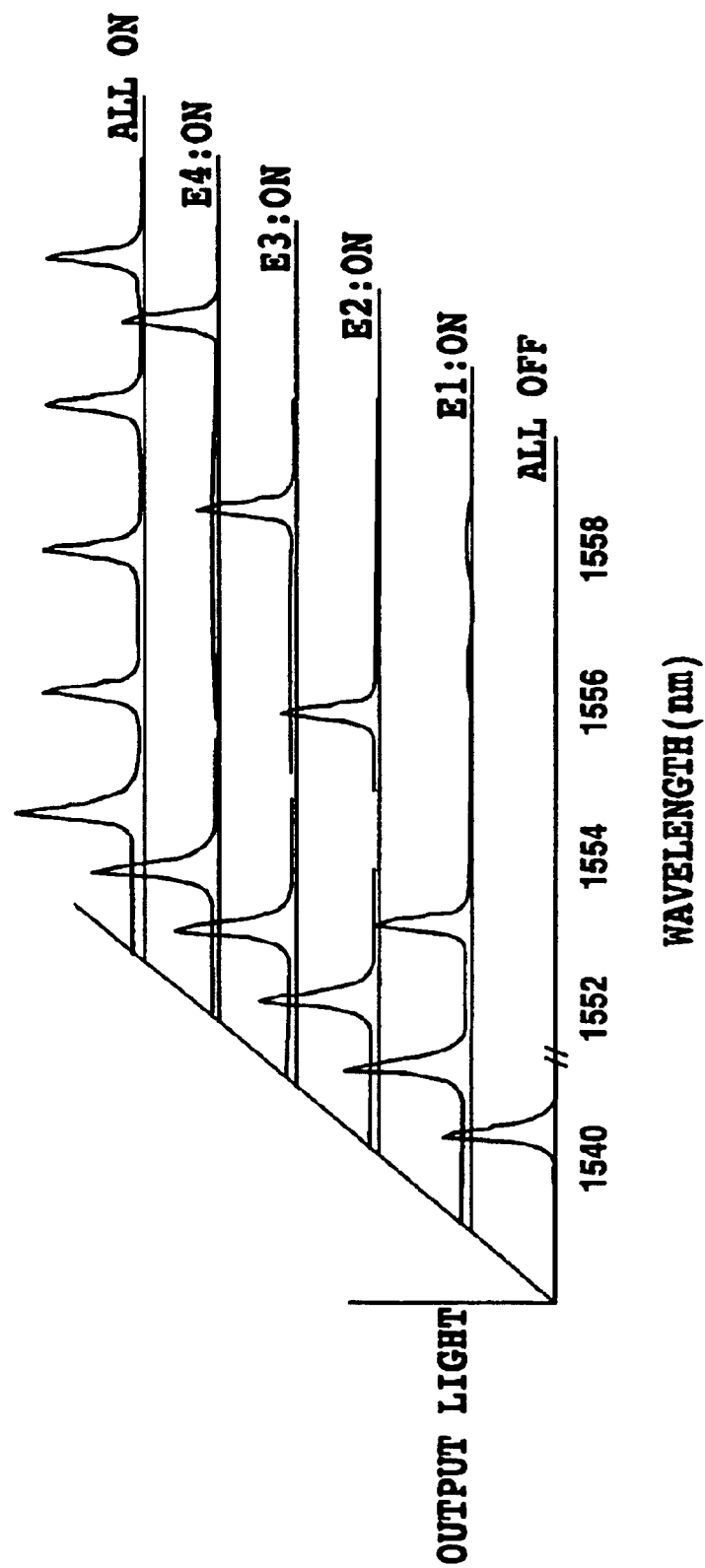
FIG. 8 is a graph illustrating spectra in the embodiments 4 and 6.

Pumping wavelengths that can achieve phase matching at the element periods are 0.770, 0.772, 0.774 and 0.776 $\mu$m. The wavelength of the signal light was set at 1.53 $\mu$m. The pumping light with the four wavelengths and the signal light with one wavelength were launched into the waveguide. Voltages corresponding to one KV/cm were applied to the four types of electrodes sequentially, and the converted light was measured by the spectrum analyzer. FIG. 8 illustrates the resultant wavelength conversion spectra. FIG. 8 illustrates that the converted light varies its wavelength successively in accordance with the changes of the electrodes the voltages are applied to, and that it functions as a bias in the wavelength conversion in which the wavelength to be electrically converted is controlled. In addition, applying voltages to several types of electrodes makes it possible to convert the signal light into several wavelengths, which shows that the device is applicable as a wavelength converter for multicast and the like.

Incidentally, when all the electrodes E1–E4 are turned on, although the 1552 nm light generated by the conversion by the electrode E1 undergoes further conversion by the electrodes E2 and E3, thereby generating light with different wavelengths, FIG. 8 illustrates only the wavelength conversion spectra obtained by eliminating the light generated by the multiple conversion by filters.

[Embodiment 5]

By using the wavelength converter of the foregoing embodiment 3, noise figure measurement of the wavelength conversion was conducted which was carried out by using the signal light (1.543 μm) modulated to a 160 Gbit/s signal and 0.775 μm pumping light (CW light). The noise figure, which was measured optically and electrically, was less than 0.5 dB, with exhibiting no noise increase by the wavelength conversion. Thus, the present embodiment 5 can respond to a high rate signal to which the wavelength converter using the optical semiconductor cannot respond. Thus, it was demonstrated that a noise-free wavelength conversion was implemented.

[Embodiment 6]

A rectangular waveguide structure was fabricated using the photolithography and liquid phase epitaxial technique. The fabricated waveguide has a refractive index difference of 2.5%, and the cutoff wavelength in a high-order mode is 0.6 μm. Thus, it functions as a single-mode waveguide for a long wavelength. The fabricated waveguide was 3 cm long, and the loss of the waveguide was 0.15 dB/cm. The substrate is composed of SrTiO3 doped with La, on which gold was deposited to form electrode patterns. It was also possible to form a similar wavelength converter using KTaO$_3$ as the substrate, and deposited Pt as the bottom electrode.

FIG. 7 is a perspective view showing a structure of the wavelength converter as a wavelength tunable wavelength light source fabricated in the same manner as the foregoing embodiment 4. The device was subjected to temperature control by a Peltier device to stabilize the efficiency and signal wavelength. The periods of the electrodes that can implement the quasi-phase matching required for the differential frequency generation of the light with the wavelength of 1.55 μm band using the pumping light with the wavelengths of 0.770, 0.775, 0.780, and 0.785 μm. In this case, the periods of the electrode elements become 12–13 μm. The output was measured using an optical spectrum analyzer with applying the voltage of one KV/cm to the electrodes, and launching the 1.53 μm signal light fed from the signal light generator and the pumping light with the wavelength of 0.770, 0.775, 0.780, and 0.785 μm fed from the pumping light generator simultaneously into the incidence end using a polarization-maintaining optical fiber.

FIG. 8 is a graph illustrating spectra generated by applying the electric field sequentially to the electrodes as described above. FIG. 8 clearly shows that the wavelength tunable light source is implemented by the differential frequency generation.

In addition, the signal light and converted light undergo the parametric amplification, and the gain of the converted light with respect to the input signal light reaches about 15 dB, which is a high gain the conventional LN wavelength converter cannot achieve. Furthermore, the conversion efficiency can also be controlled by varying the intensity of the electric field applied, and it is only the signal light that is output by turning off the electric field.

It was also possible to control the electric field such that the converted light intensity was maintained at a constant value against the variable input signal light intensity with fixing the pumping light intensity and by monitoring the output signal light intensity. The wavelength converter could also maintain the intensity of the output light at nearly the fixed value by operating it in the gain saturation region. Alternatively, the output light intensity could be maintained at a fixed value by applying progressively strong electric field as the electrodes approached the output side.

FIG. 7 shows a configuration in which the electrode surfaces 24 and 25 are disposed in the vertical direction. However, the TE and TM polarizations can be generated independently by disposing, besides the electrodes disposed in the vertical direction, electrodes in the direction horizontal to the surface, and by supplying the horizontal electrodes with electric field independently of the vertical electrodes. FIGS. 9A and 9B are cross-sectional views showing planar optical waveguide in accordance with the present invention, which is sectioned normally to the waveguide at the positions of the electrodes. FIG. 9A shows a structure that disposes the electrode surfaces 31$a$ and 33 in the vertical direction, and FIG. 9B shows a structure that disposes the electrode surfaces 33$a$ and 33$b$ in the horizontal direction.

[Embodiment 7]

In the configuration similar to the embodiment 6, the electric field modulated by 10 GHz was sequentially applied to the electrodes. Thus, at 1550, 1560, 1570 and 1580 nm, a light signal modulated by 10 GHz can be obtained as the need arises. This proves that it functions as a variable wavelength light source of 10 Gbit/s. The channel spacing can be readily varied by controlling the periods of the electrode elements, that is, by making phase matching between the wavelength of the pumping light and the wavelength of the signal light. Furthermore, if the signal light of 1530 nm consists of a pulse train of 100 GHz of a fiber-ring laser, the variable wavelength light source can also generate the signal light of 100 Gbit/s.

Moreover, an increasing number of the electrode patterns fabricated can easily increase the number of the variable wavelengths. Thus, the wavelength tunable light source covering a 1250–1700 nm range was easily implemented by disposing chips with different electrode patterns in parallel.

[Embodiment 8]

The number of the wavelengths was increased in the same method as the embodiment 6 except that the present embodiment 8 used the pumping light with 767.75, 774.75, 784.75 and 804.75 nm, and signal light including 10 wavelengths of 1528, 1529, 1530, 1531, 1532, 1533, 1534, 1535, 1536 and 1537 nm as the light launched into the multi-wavelength light source, thereby implementing a multiple wavelength scheme. FIG. 10 shows the wavelengths obtained by applying the electric fields to the electrode as required. As shown in FIG. 10, when the electrodes are each turned on, the signal with the wavelength corresponding to the differential frequency is obtained. Accordingly, applying the electric fields to each electrode makes it possible to double the number wavelengths.

In addition, since turning on all the electrodes will allow each electrode to generate the differential frequency, and the next electrode to perform the differential frequency generation again, the signal light passing through the four stages of the electrodes will include the total of 160 waves. Thus, applying the present invention can implement a multi-wavelength light source by a single-chip device with ease. It is obvious that connecting chips, each including one electrode, by fibers can also implement a similar light source. In addition, as clearly seen from FIG. 10, selecting the electrode to which the electric field is applied makes it possible to obtain a signal including a necessary number of wavelengths in a required wavelength range.

[Embodiment 9]

The initially incident 10 wavelengths, which were launched into the foregoing embodiment 8 of the multi-wavelength light source, were generated by the multi-wavelength light source with the same structure as the embodiment 6 including 10 types of electrodes. In this condition, an experiment similar to that of embodiment 8 was conducted using a 100 GHz pulse train of a fiber-ring laser or semiconductor mode-locking laser as the initial signal light among them. Although all the resultant wavelengths were the same as those of the foregoing embodiment 8, all the signals were composed of short pulses modulated by 100 GHz. Thus, the method in accordance with the present invention has an advantage of being able to generate the signal light with multiple wavelengths consisting of short pulses easily.

[Embodiment 10]

The temperature of the waveguide with the electrodes, which was fabricated by the same method as the foregoing embodiments, was dropped with applying electric field. The phase transition temperature of the KLTN crystal constituting the core was 5° C., and the waveguide was cooled down to −10° C., followed by removing the application of the electric field. In this condition, the wavelength conversion was carried out in the same method as the foregoing embodiments. In this case, although the electric field was not applied, the foregoing wavelength conversion efficiency was achieved. This is because the temperature drop caused the crystal to transition from the cubic system to the tetragonal system, and the electric field due to spontaneous polarization generated in the crystal brought about the secondary nonlinear effect in place of the external electrodes. Using this method makes it possible to carry out the wavelength conversion without applying the electric field continuously, and to perform the same wavelength conversion induced by the electric field as in the foregoing embodiments by elevating the temperature above the phase transition temperature. The phase transition temperature of the crystal can be controlled by varying the composition ratio of Nb and Ta. Accordingly, the design becomes possible of the wavelength converter that will minimize the power consumption of the temperature control near the room temperature by selecting the composition depending on whether the electric field application precedes, or the operation is fixed to that does not induce the electric field.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A wavelength converter for producing converted light with a wavelength corresponding to an energy difference between signal light and pumping light with a wavelength different from that of the signal light, by launching the signal light and the pumping light into a crystal material simultaneously, wherein said crystal material consists of a crystal composed of at least one of $KTa_{1-x}Nb_xO_3$ and $K_{1-y}Li_yTa_{1-x}Nb_xO_3$ wherein, when an electric field is applied to the crystal material, converted light is produced, and when the electric field is removed, substantially converted light is produced.

2. The wavelength converter as claimed in claim 1, wherein said crystal material comprises at least one comb electrode with an electrode period that will establish quasi-phase matching between the signal light and the pumping light.

3. The wavelength converter as claimed in claim 2, wherein said at least one electrode comprises at least two electrodes with different periods.

4. The wavelength converter as claimed in claim 2, wherein said crystal material comprises an electrode structure that enables the electric field to be applied to said electrode structure in at least two directions.

5. The wavelength converter as claimed in claim 2, wherein said crystal material comprises a core with a high refractive index and a cladding with a low refractive index, both of them being composed of at least one of $KTa_{1-x}Nb_xO_3$ and $K_{1-y}Li_yTa_{1-x}Nb_xO_3$ with different compositions.

6. The wavelength converter as claimed in claim 2, further comprising an application halting means for halting applying the electric field when a temperature of a waveguide is dropped below a phase transition temperature with applying the electric field, wherein said wavelength converter carries out wavelength conversion after said application halting means halts applying the electric field.

7. The wavelength converter as claimed in claim 1, wherein said crystal material comprises an electrode structure that enables the electric field to be applied to said electrode structure in at least two directions.

8. The wavelength converter as claimed in claim 7, further comprising an application halting means for halting applying the electric field when a temperature of a waveguide is dropped below a phase transition temperature with applying the electric field, wherein said wavelength converter carries out wavelength conversion after said application halting means halts applying the electric field.

9. The wavelength converter as claimed in claim 1, wherein said crystal material comprises a core with a high refractive index and a cladding with a low refractive index, both of them being composed of at least one of $KTa_{1-x}Nb_xO_3$ and $K_{1-y}Li_yTa_{1-x}Nb_xO_3$ with different compositions.

10. The wavelength converter as claimed in claim 9, further comprising an application halting means for halting applying the electric field when a temperature of a waveguide is dropped below a phase transition temperature with applying the electric field, wherein said wavelength converter carries out wavelength conversion after said application halting means halts applying the electric field.

11. The wavelength converter as claimed in claim 1, further comprising an application halting means for halting applying the electric field when a temperature of a waveguide is dropped below a phase transition temperature with applying the electric field, wherein said wavelength converter carries out wavelength conversion after said application halting means halts applying the electric field.

12. The wavelength converter as claimed in claim 1, wherein the converted light is modulated by modulating the electric field applied to said crystal material.

13. The wavelength converter as claimed in claim 12, wherein said crystal material comprises at least one comb electrode with an electrode period that will establish quasi-phase matching between the signal light and the pumping light.

14. The wavelength converter as claimed in claim 13, wherein said at least one electrode comprises at least two electrodes with different periods.

15. The wavelength converter as claimed in claim 12, wherein said crystal material comprises an electrode structure that enables the electric field to be applied to said electrode structure in at least two directions.

16. The wavelength converter as claimed in claim 12, wherein said crystal material comprises a core with a high refractive index and a cladding with a low refractive index, both of them being composed of at least one of $KTa_{1-x}Nb_xO_3$ and $K_{1-y}Li_yTa_{1-x}Nb_xO_3$ with different compositions.

17. The wavelength converter as claimed in claim 12, further comprising an application halting means for halting applying the electric field when a temperature of a waveguide is dropped below a phase transition temperature with applying the electric field, wherein said wavelength converter carries out wavelength conversion after said application halting means halts applying the electric field.

18. The wavelength converter as claimed in claim 1, further comprising at least two electrodes with different periods.

19. The wavelength converter as claimed in claim 18, wherein said crystal material comprises a core with a high refractive index and a cladding with a low refractive index, both of them being composed of at least one of $KTa_{1-x}Nb_xO_3$ and $K_{1-y}Li_yTa_{1-x}Nb_xO_3$ with different compositions.

20. The wavelength converter as claimed in claim 18, further comprising an application halting means for halting applying the electric field when a temperature of a waveguide is dropped below a phase transition temperature with applying the electric field, wherein said wavelength converter carries out wavelength conversion after said application halting means halts applying the electric field.

21. The wavelength converter as claimed in claim 1, further comprising an application halting means for halting applying the electric field when a temperature of a waveguide is dropped below a phase transition temperature with applying the electric field, wherein said wavelength converter carries out wavelength conversion after said application halting means halts applying the electric field.

22. A wavelength converter operating as a multi-wavelength light source including a planar optical waveguide comprising:
 a core with a high refractive index composed of a crystal material with a composition of at least one of $KTa_{1-x}Nb_xO_3$ and $K_{1-y}Li_yTa_{1-x}Nb_xO_3$;
 a cladding surrounding said core;
 at least one electrode that is formed on a surface of said optical waveguide and has a fixed electrode period;
 signal light generating means for generating signal light with at least one wavelength; and
 pumping light generating means for generating pumping light with a wavelength different from that of the signal light output from said signal light generating means, wherein
  the signal light and the pumping light are launched simultaneously into said optical waveguide to generate converted light with at least one wavelength wherein, when an electric field is applied to the crystal material, converted light is produced, and when the electric field is removed, substantially converted light is produced.

23. The wavelength converter as claimed in claim 22, wherein the electrode period satisfies quasi-phase matching condition required for differential frequency generation based on an energy difference between the signal light and the pumping light.

24. The wavelength converter as claimed in claim 23, wherein said electrode has a structure that enables the electric field to be applied in at least one of two directions parallel to a direction of an electric field of TE polarization of the signal light and parallel to a direction of TM polarization of the signal light.

25. The wavelength converter as claimed in claim 23, wherein the converted light is modulated by modulating a voltage applied to said electrode.

26. The wavelength converter as claimed in claim 23, wherein said at least one electrode comprises a plurality of electrodes with different periods.

27. The wavelength converter as claimed in claim 23, further comprising an application halting means for halting applying the electric field when a temperature of a waveguide is dropped below a phase transition temperature with applying the electric field, wherein said wavelength converter carries out wavelength conversion after said application halting means halts applying the electric field.

28. The wavelength converter as claimed in claim 22, wherein said electrode has a structure that enables the electric field to be applied in at least one of two directions parallel to a direction of an electric field of TE polarization of the signal light and parallel to a direction of TM polarization of the signal light.

29. The wavelength converter as claimed in claim 28, wherein the converted light is modulated by modulating a voltage applied to said electrode.

30. The wavelength converter as claimed in claim 28, wherein said at least one electrode comprises a plurality of electrodes with different periods.

31. The wavelength converter as claimed in claim 28, further comprising an application halting means for halting applying the electric field when a temperature of a waveguide is dropped below a phase transition temperature with applying the electric field, wherein said wavelength converter carries out wavelength conversion after said application halting means halts applying the electric field.

32. The wavelength converter as claimed in claim 22, wherein the converted light is modulated by modulating a voltage applied to said electrode.

33. The wavelength converter as claimed in claim 32, wherein said at least one electrode comprises a plurality of electrodes with different periods.

34. The wavelength converter as claimed in claim 32, further comprising an application halting means for halting applying the electric field when a temperature of a waveguide is dropped below a phase transition temperature with applying the electric field, wherein said wavelength converter carries out wavelength conversion after said application halting means halts applying the electric field.

35. The wavelength converter as claimed in claim 22, wherein said at least one electrode comprises a plurality of electrodes with different periods.

36. The wavelength converter as claimed in claim 35, further comprising an application halting means for halting applying the electric field when a temperature of a waveguide is dropped below a phase transition temperature with applying the electric field, wherein said wavelength converter carries out wavelength conversion after said application halting means halts applying the electric field.

37. The wavelength converter as claimed in claim 22, further comprising an application halting means for halting applying the electric field when a temperature of a waveguide is dropped below a phase transition temperature with applying the electric field, wherein said wavelength converter carries out wavelength conversion after said application halting means halts applying the electric field.

* * * * *